C. A. HENNEUSE.
TRACTION APPARATUS.
APPLICATION FILED NOV. 28, 1910.
1,041,280.
Patented Oct. 15, 1912.
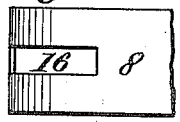
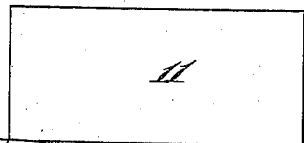
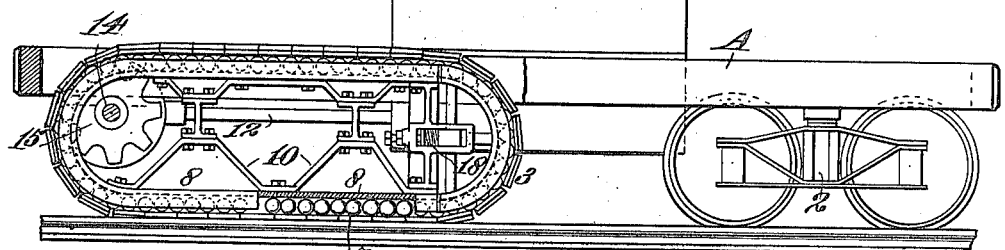
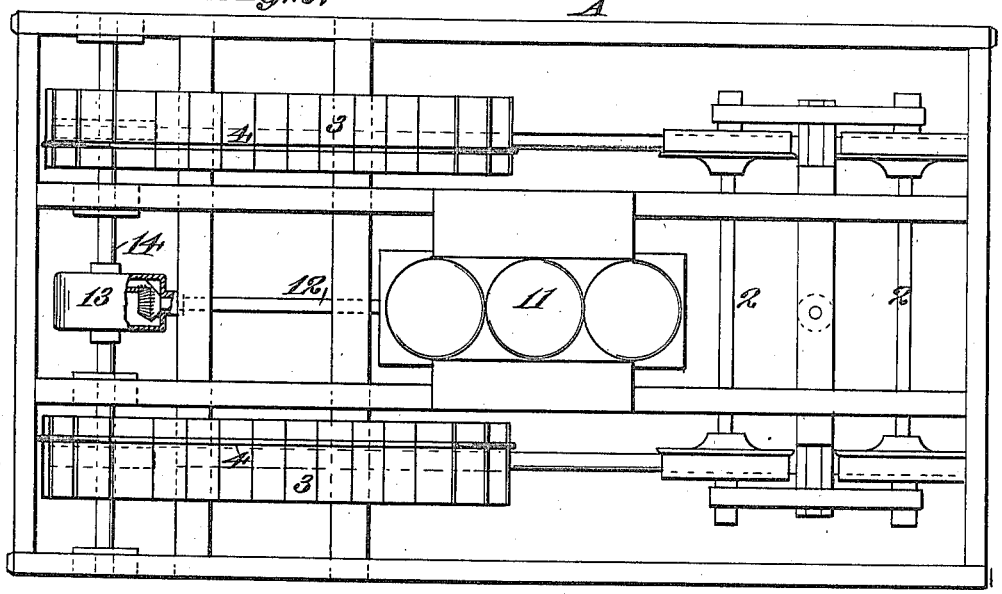
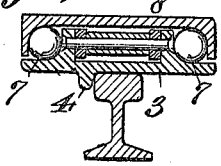
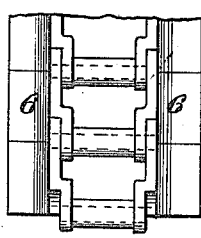
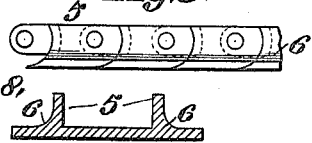
Witnesses,
Charles Pickles
R. S. Berry
Inventor:
Clarence A. Henneuse,
By Geo. H. Strong
atty

UNITED STATES PATENT OFFICE.

CLARENCE A. HENNEUSE, OF BERKELEY, CALIFORNIA, ASSIGNOR OF TWO-THIRDS TO ALFRED C. JOHNSON AND FRED D. CALKINS, BOTH OF SUNNYVALE, CALIFORNIA.

TRACTION APPARATUS.

1,041,280.

Specification of Letters Patent.

Patented Oct. 15, 1912.

Application filed November 28, 1910. Serial No. 594,469.

*To all whom it may concern:*

Be it known that I, CLARENCE A. HENNEUSE, citizen of the United States, residing at Berkeley, in the county of Alameda and State of California, have invented new and useful Improvements in Traction Apparatus, of which the following is a specification.

My invention relates to an improved means for applying tractive force to vehicles of any description, and it may be either mounted upon the rails of a track or adapted to travel directly upon the road surface.

It consists in the combination of parts and details of construction which will be more fully explained by reference to the accompanying drawings, in which—

Figure 1 is a side elevation of the device. Fig. 2 is a plan view. Fig. 3 is a detail cross-section of the chain and runway. Fig. 4 is a detail plan view of the chain. Fig. 5 is a detail side elevation of the links. Fig. 6 is a detail plan view of the runway at the driving end. Fig. 7 is a detail plan view of the runway at the adjusting end. Fig. 8 is a detail cross-section of the link without the flange.

It is the object of my invention to provide an improved means for applying tractive force to propel vehicles of various kinds by means of an extended, endless traveling belt surface through which power may be transmitted.

In the drawings I have indicated a vehicle A, which may be of any suitable description. One end of the vehicle is here shown as carried upon an ordinary wheel truck, as at 2, and the other consists of an endless belt surface with suitable bearings and means for transmitting motion thereto.

The device consists of an endless chain of connected links having an outer surface of shoes suitably formed to travel over the rails or surface for which the vehicle is designed, and the inner surfaces of these links are adapted to move in relation with anti-frictional supports which travel over a rigid interior shoe, and thus maintain the bearing shoe surfaces in line with each other. The construction is then as follows: The links have their outer surfaces 3 suitably fitted to rest upon the ground or by means of flanges 4 they may travel upon rails as shown in Fig. 3; these flanges 4 projecting downwardly in a manner similar to the flanges of railway wheels. These shoes have upwardly projecting flanges 5 and the outer surfaces of which are curved, as shown at 6 to form concaved bearings which form seats for balls 7. 8 represents the opposite surface upon which the balls travel. It consists of an elongated, rigid channeled plate having semi-circular ends and the inner surface of its flanges form the opposing race-way between which and the flanges 5 of the shoes, the balls are adapted to roll. Thus, when power is applied to cause the chain of links or shoes to move, the outer surfaces resting upon the ground will have a frictional contact while the balls will constantly travel between the two parts of the race-way, previously described, and the thickness of the inner portion 8 supplemented by truss sections, as at 10, if required will prevent the bending of these plates and thus maintain the traveling surface of the shoes in a substantially straight line so that the whole traction effort may be transmitted through these surfaces. Propulsion may be effected from any suitable motor, as at 11 and a driving shaft 12 through a differential gear which is connected at 13 to the bearing shaft members 14. These shafts extend outwardly in opposite directions from the differential gear, and power is applied to drive them through a sprocket wheel, as at 15. The case 8 which forms an inclosure within which the balls travel, is slotted as shown at 16 to allow the sprocket wheel 15 to turn through this casing so as to engage and drive the flexible chain. The end of the race-way opposite the sprocket end is movable to accommodate wear and extension of the chain and is formed as shown at 17, so that the over-lapping parts will form a continuous bearing surface for the balls. Adjustment may be made for the wear and extension of this chain link by making the segmental track at one end movable, as described, with relation to the other portion; this being effected by springs or screws, as shown at 18.

Having thus described my invention, what I claim and desire to secure by Letters Patent is—

An improved traction apparatus, including a vehicle body, rigid, longitudinally channeled supports with opposed, internal concaved surfaces, said supports having horizontal parallel upper and lower sides and segmental connecting ends, truss frames interposed between the horizontal sides, one of said ends being separable from the supports and from the truss frames, chains of flexibly connected shoes having up-turned flanges with exterior curved surfaces forming ball races opposing the fixed ones, balls fitting said races, means for adjusting the separable curved ends of the supports, a motor, and mechanism connecting therewith to propel the chain.

In testimony whereof I have hereunto set my hand in the presence of two subscribing witnesses.

CLARENCE A. HENNEUSE.

Witnesses:
 CHARLES EDELMAN,
 A. P. LATHROP.